United States Patent
Petersson et al.

(10) Patent No.: US 6,744,052 B1
(45) Date of Patent: Jun. 1, 2004

(54) X-RAY PIXEL DETECTOR DEVICE AND FABRICATION METHOD

(76) Inventors: Sture Petersson, Sandmovägen 5B, Uppsala (SE), SE-756 47; Jan Linnros, Ehrenstralsvägen 42, Bromma (SE), SE-168 51; Christer Fröjdh, Fänriksgatan 4A, Sundsvall (SE), SE-852 38

( * ) Notice: Subject to any disclaimer, the term of this patent is extended or adjusted under 35 U.S.C. 154(b) by 0 days.

(21) Appl. No.: 09/889,851
(22) PCT Filed: Jan. 21, 2000
(86) PCT No.: PCT/SE00/00135
§ 371 (c)(1), (2), (4) Date: Oct. 17, 2001
(87) PCT Pub. No.: WO00/43810
PCT Pub. Date: Jul. 27, 2000

(30) Foreign Application Priority Data

Jan. 21, 1999 (SE) .............................. 9900181

(51) Int. Cl.⁷ ................................ G01T 1/20
(52) U.S. Cl. ................. 250/370.11; 250/361 R
(58) Field of Search ............... 250/361 R, 367, 250/368, 483.1, 370.11, 458.1

(56) References Cited

U.S. PATENT DOCUMENTS 4,533,489 A 8/1985 Utts et al.
5,149,971 A 9/1992 McElhaney et al.
5,294,795 A 3/1994 Lehtinen et al.
5,496,502 A 3/1996 Thomson
5,519,227 A 5/1996 Karellas
6,177,236 B1 * 1/2001 Apte .......................... 430/320

FOREIGN PATENT DOCUMENTS

EP  0 534 683  3/1993

* cited by examiner

*Primary Examiner*—Constantine Hannaher
*Assistant Examiner*—Timothy Moran
(74) *Attorney, Agent, or Firm*—Young & Thompson

(57) ABSTRACT

A method and device for producing an X-ray pixel detector, for X-ray photons, the detector presenting high efficiency combined with high resolution for obtaining a high image quality detector while at the same time minimizing the X-ray dose used. The application is particularly important whenever the X-ray photon absorption distance is much longer than the required pixel size. The arrangement presents a structure based on light-guiding of secondarily produced photons within a scintillating pixel detector in conjuction with, a CCD or a CMOS pixel detector. The structure presents a matrix (8) having deep pores (10) fabricated by high-aspect ratio silicon etching techniques producing very thin walls and with a pore spacing less or equal to the size of a pixel (2) of the image detector used. The pore matrix is subsequently filled by melting a scintillating material into the pores such that, in each pore, a single scintillating block is formed. The silicon matrix (8) may further utilize a reflective layer to increase light guiding down to the image detector chip.

11 Claims, 3 Drawing Sheets

X-RAY PIXEL DETECTOR DEVICE AND FABRICATION METHOD

TECHNICAL FIELD

The present invention relates to an X-ray pixel detector, and more exactly to a pixel-camera based i g detector for X-ray photons with high efficiency combined with high resolution.

BACKGROUND

Silicon devices as CCDs and CMOS pixel detectors are frequently used for X-ray imaging. Due to the low stopping for X-rays in silicon, the detector is generally coated with a scintillating layer. When using scintillating layers for imaging there is a trade-off between quantum efficiency and resolution. In order to get high quantum efficiency for X-rays the layer should be made thick, but that will reduce the spatial resolution in the image. The quantum efficiency for X-rays is one of the most critical parameters for medical X-ray imaging devices since the signal to noise ratio in the image depends on the number of X-ray photons contributing to the image. Since photoelectric absorption is a single event an X-ray photon will either be fully absorbed or pass unnoticed through the detector.

X-ray generators for dental X-ray imaging operate with an accelerating voltage of 60–90 kV giving mean photon energy in the range 30–40 keV. The material thickness required to stop 80% of the X-ray photons is in the range 150–500 µm for the commonly used scintillators. The primary interaction between the photon and the material, photoelectric absorption, is a single event. The light in the scintillator is then generated by a large number of secondary reactions taking place within a few microns from the location of the primary interaction. As a result a flash of light is generated close to the spot of the primary interaction and radiated in all directions. The quantum efficiency for X-rays is then related to the probability for the primary interaction to occur and to a very small extent to the secondary interactions. In the energy range of interest for such an application and with the materials used as scintillators the primary interaction is generally a photoelectric absorption. Compton scattering and other events are less likely to occur.

The light generated in the scintillator is projected onto the sensor with a spot size, which is proportional to the distance between the point of interaction and the position of absorption in the sensor. The projection is also affected by the refractive indexes of the materials the beam will pass. For a typical combination of scintillator and CCD, the scintillator thickness should be less than 100 µm to achieve a spatial resolution>10 line-pairs/mm, as required for dental X-ray imaging.

A method to improve the spatial resolution of thick scintillating layers is to define pixels in the scintillator, as proposed in EP-A2-0 534 683, U.S. Pat. No. 5,059,800 and U.S. Pat. No. 5,831,269 and to make that the light generated within one pixel is confined within that pixel. Pixel definition in scintillators can be done in a number of ways, e.g. columnar growth of scintillator crystal or groove etching in scintillating films. In EP-A2-0 534 683 dicing or cutting is suggested for separating scintillator elements from a large scintillator block, as appropriate for larger lateral dimensions.

The method for columnar growth of scintillating crystals is well known. It has been used to grow CsI for many years. The document WO93/03496 discloses for instance growth of separate columns in different scintillators whereas in U.S. Pat. No. 4,663,187 a scintillator is held close to the melting point resulting in the formation of domains. The disadvantage of techniques for growth of separated columns is that the columns tend to grow together for thick layers and that light will leak to adjacent columns. It is difficult to apply a light reflector between the columns.

Etching of grooves in scintillating materials is considered to be extremely difficult due to the high aspect ratios required by the application. With a pixel size of 50 µm and an allowed area loss of less than 20% the groove width should be less than 5 µm. If the film thickness is 200 µm the aspect ratio will be 40. This aspect ratio can only be realised by advanced silicon processing techniques whereas etching techniques for scintillating materials are far less developed. Nevertheless, U.S. Pat. No. 5,519,227 claims that laser-based micro-machining techniques could be used to define narrow grooves in a scintillating substrate. However, the technique is inherently slow as the laser needs to be scanned several times in every groove. Furthermore, it is not clear whether re-deposition onto the walls will occur as a result of this laser ablation, which could potentially block a narrow groove.

Summarising, various techniques have been proposed for the fabrication of a scintillator array that would provide light guiding of secondary photons to an underlying imaging detector, These techniques are all restricted in one or several aspects: either too large lateral dimensions (cutting, dicing), problems of forming a well-defined narrow wall (laser ablation), cross talk between adjacent pixels (columnar growth technique) or a lengthy processing time (valid for most of these techniques). Finally, deposition of a reflective layer in the grooves is usually suggested to improve light guiding and reduce cross talk. But, none of these fabrication schemes have proposed a detailed scheme how the reflective layer would be produced. This is not an easy task considering the narrow pore geometry and materials involved.

Therefore there is still a desire to develop a device and it's associated fabrication method, which should be able to handle thick scintillating material layers but with a maintained resolution which corresponds to the individual pixel size. Furthermore, the fabrication technique should preferably be fast, as for a mass scale production type, and relying as much as possible on existing processes and machinery.

SUMMARY

The objective of the present invention is to design and develop a fabrication method for an X-ray pixel detector, i.e. an imaging detector for X-ray photons presenting high efficiency combined with high resolution to obtain a high image quality detector while at the same time minimizing the X-ray dose used. The application is particularly important whenever the X-ray photon absorption distance is much longer than the required pixel size.

It is proposed to take advantage of the mature processing tools of the silicon microelectronics technology where lateral dimensions on a micrometer scale may readily be achieved. Thus, a silicon mold is fabricated by high-aspect ratio etching of a silicon substrate for form an array of pores. This array is subsequently oxidized to provide a low refractive index layer in contact with each individual scintillator block, formed by melting a scintillating material into the pores.

A scintillator device according to the present invention presents a structure based on light guiding of secondarily produced scintillating photons in a pixel detector in conjunction with, for instance, a CCD or a CMOS pixel detector. The structure according to the invention presents a matrix having deep pores created by thin walls presenting a pore spacing appropriate to the image detector in use, and may utilize a reflective layer on the walls of the matrix to increase light guiding down to the image detector chip.

BRIEF DESCRIPTION Of THE DRAWINGS

The invention, together with further objects and advantages thereof, may best be understood by making reference to the following description taken together with the accompanying drawings, in which.

DETAILED DESCRIPTION

General Features

The most developed etching techniques exist for silicon processing. According to the present application a grid is created by etching rectangular holes in a silicon wafer. The holes can be etched to a certain depth or go all the way through the wafer. The holes are then filled with scintillating material.

The performance of such a device strongly depends on how well the holes are filled, the transparency of the scintillator and the reflection properties of the walls of the hole.

Figure 1:
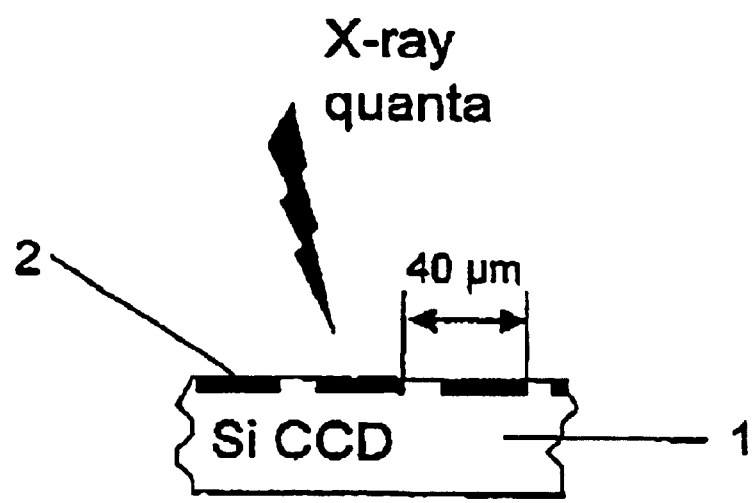
FIG. 1 illustrates a silicon CCD pixel detector for direct irradiation by X-rays.
Figure 2:
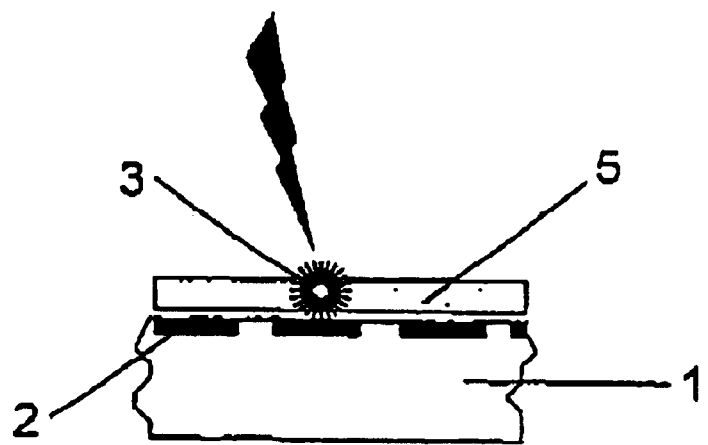
FIG. 2 illustrates a pixel detector as of FIG. 1 but provided with a thin scintillator for increasing its efficiency for X-ray radiation.
Figure 3:
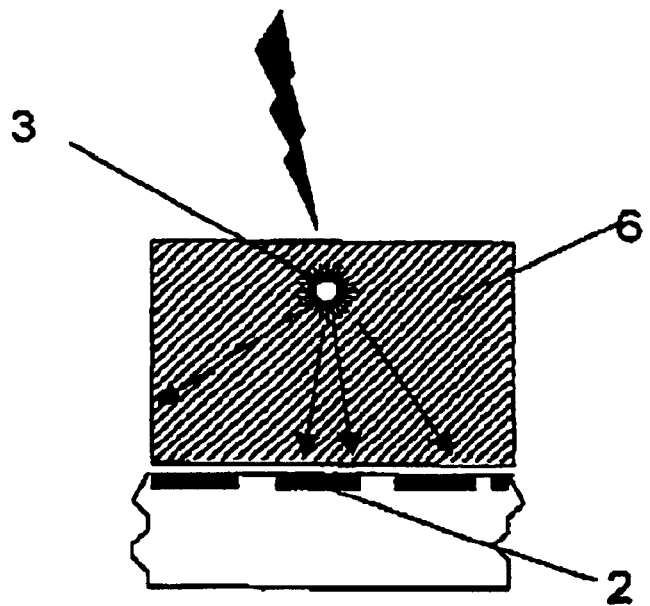
FIG. 3 illustrates a pixel detector as of FIG. 1 provided with a thick scintillator for further increasing the efficiency for X-ray radiation, but then loosing resolution.

The present X-ray pixel detector concept is for clarity compared to existing technology demonstrated in FIGS. 1 to 4. FIG. 1: A standard silicon CCD arrangement has a very low efficiency for X-ray photon detection, normally of the order of a few per cent. This is because the penetration depth of X-ray photons, at energies of the order 40 keV, is of the order of 1 cm in silicon and thus the fraction absorbed within the active CCD layer is small The efficiency will preferably be increased significantly by using a scintillating material emitting a large number of visible photons for every absorbed X-ray photon as is indicated in FIG. 2. Typical absorption lengths for X-ray photons, at energies of the order 40 keV, are several 100 $\mu$m. As already mentioned a layer of the order 300 $\mu$m of CsI is needed to absorb about 80% of the X-ray photons. Thus, for thick scintillating films as indicated in FIG. 3, almost al X-ray quanta may be absorbed, which results in a high efficiency detector. However, the trade-off is resolution, which becomes much worse as the scintillator emits photons isotropically, such that nearby pixels will also detect a significant number of photons. An alternative route is to use a thin scintillating film (of about same thickness as a pixel size) as indicated in FIG. 2, but at the expense of a much lower efficiency.

Figure 4:
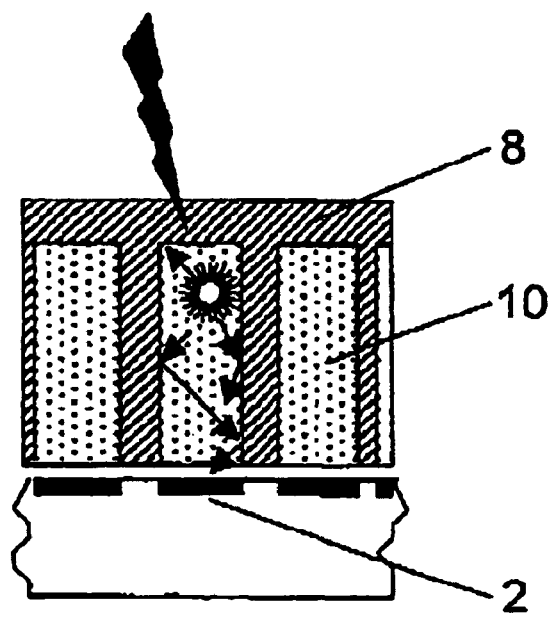
FIG. 4 illustrates a CCD pixel detector using a thick pixel scintillator residing inside pores formed in a matrix material according to the present invention for maximum sensitivity and maintained resolution.

Finally, in FIG. 4 is shown the concept of the invention resulting in both high efficiency and high resolution. Here, a thick scintillator is used which has been patterned into pixels corresponding to the size of the pixels of the detector, e.g. a CCD, in such a way that the scintillator pixels also serve as light guides which confine the emitted photons to the same pixel element only. Thus, no cross talk between pixels takes place and, depending on the pixel thickness (length perpendicular to the CCD sauce) up to 100% of the incoming X-ray photons may be absorbed. However, in order to achieve a large effective detection area the spacing between pixels must be short, e.g. for a typical 44 $\mu$m pixel size a 4 $\mu$m gap between pixels results in ~82% efficiency due to the 'dead area' in between pixels. Clearly, to minimize cross-talk pixels may be reflection coated or the medium in between should be highly absorbing.

Figures 5, 6:
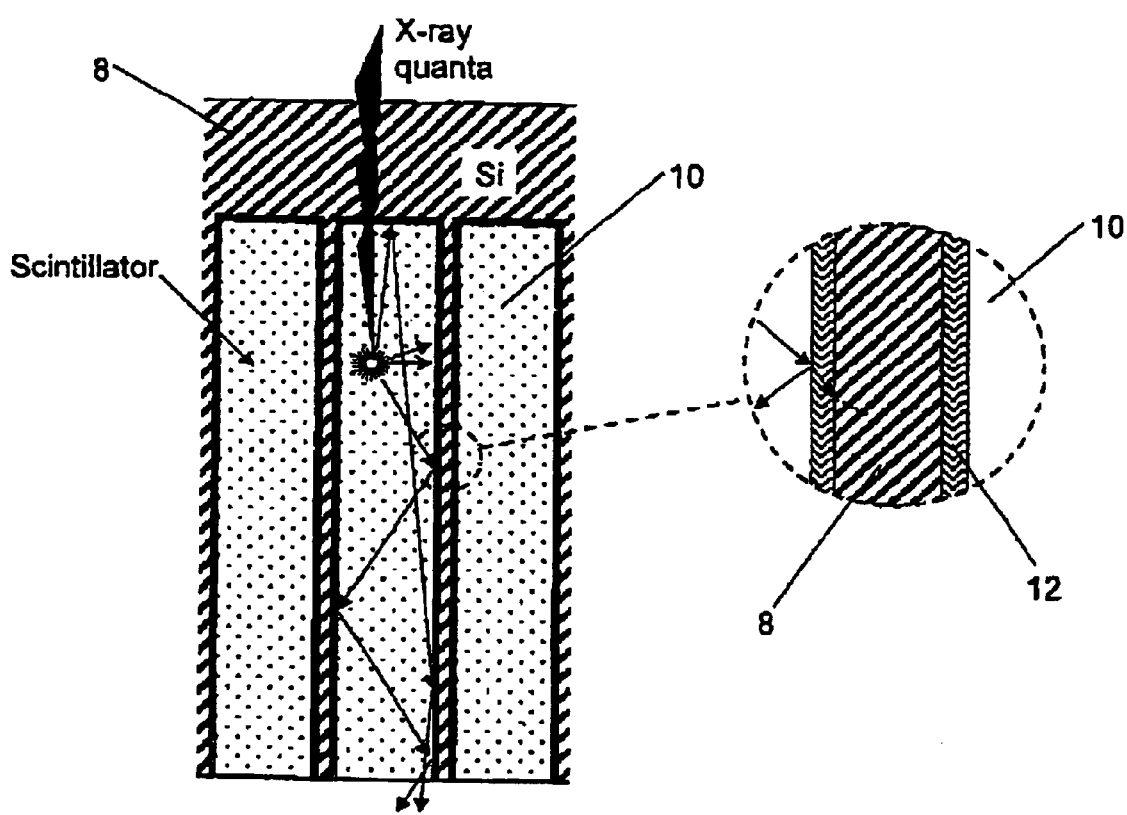
FIG. 5 is a more detailed view of the structure forming pores for increasing the efficiency of a CCD pixel detector.
FIG. 6 is an enlargement of a portion of a pore indicating an extra layer of silicon oxide for improving the wall reflecting properties.

The fabrication of pixels having a thickness of 300 $\mu$m and a gap of about 4 $\mu$m from a scintillating material is not an easy task. The present invention therefore benefits from the mature silicon process technology using a silicon matrix wherein corresponding pores have been fabricated and successively filled with a scintillator material. The fabrication technology involves more or less standard silicon fabrication technologies such as Deep Reactive Ion Etching (DRIE), oxidation and/or metallisation. A schematic drawing of the structure is shown in FIG. 5 where 3 pixels are displayed together with a close-up of the wall structure between adjacent pixels being demonstrated in FIG. 6. In essence, the structure contains three different materials to provide the light-guiding effect the processing of which is accomplished one after the other:

Silicon Pore Matrix

The silicon pore matrix of the present application may be fabricated using two different techniques: Deep Reactive Ion Etching (DRIE) or Electrochemical etching. DRIE is now an established technique and several hundred $\mu$m deep pores may be fabricated. It has been found that it is possible to make, for instance, 40×40 $\mu$m square-formed pores with a wall thickness of 3–4 $\mu$m (representing ~80% active area) and with a depth of a few hundred $\mu$m. A similar structure may be formed by electrochemical etching of silicon starting from pore initiation cones made by conventional lithography and non-isotropic etching.

Wall Reflection Layer

Scintillating materials usually have an index of refraction (for CsI n=1.79) which is significantly lower than that of silicon (n=3.4). Thus, the major fraction of scintillating photons impinging on the pore walls will penetrate into the silicon (Si) matrix unless some reflection coating of the pore walls has been provided. Therefore, this simple structure will have much lower efficiency since no light guiding exists. In the silicon matrix the light will be quickly absorbed due to the high absorption coefficient for visible light in silicon. However, note that this is a clear advantage of the present invention, as opposed to several of the structures cited in the Background paragraph, as it totally eliminates any cross talk between pixels.

To provide light guiding a reflecting layer must be introduced at the walls. This may be accomplished either by oxidation or by coating with a metal layer. Whereas silicon dioxide is much more stable during subsequent processing, metal coating provides better reflection. In the case of an oxide, a total reflection results whenever the entrance angle is larger than the result of the expression arcsin(n2/n1), where n2 and n1 represents a respective refractive index The reflection results in a light-guiding cone propagating upwards and downwards in the pore, see FIG. 5. The difference to a metal-coated pore (where all light would be guided in the pore) is, however, not that large as light rays impinging on the walls close to normal incidence correspond to very long path lengths before reaching the image detector cell and thus absorption is more likely.

Finally, a reflecting layer at the bottom of the pore (or at the top surface for a pore structure, which is transparent) is desirable in order to redirect and collect photons emitted in the upward direction.

Filling With Scintillating Material

Filling of the pores with scintillating material is a crucial step. Extensive tests have proved that filling of the pores with scintillating powder without melting does not yield an operational device structure. This is because grain boundary scattering of the light results in a very short penetration distance. An index-matched fluid could possibly circumvent this problem but the low effective density of the scintillator powder (large unfilled fraction) would then demand very deep pores.

Due to this fact our invention involves melting of the scintillating material to form single or polycrystalline blocks of scintillator material within each pore. For this purpose we have used CsI as a suitable material as it does not decompose upon melting. The melting and filling should be carried out in a vacuum to reduce problems with air bubbles in the pores, which significantly affects efficiency and the light guiding ability of the pores.

In summary, the present invention is based upon light guiding of secondarily produced scintillating photons in a pixel detector in conjunction with, for instance a CCD camera or a corresponding device. The three ingredients of the preferred embodiment of the structure are:

a) A matrix with deep pores, thin walls and a pore spacing appropriate to the image detector chip in use b) A reflective layer on the walls to increase light guiding down to the image detector chip c) A suitable scintillating material which is melted into the pores to form a single scintillating block in order to eliminate grain-boundary scattering In addition, the invention concerns a suitable fabrication method to this structure in an efficient way suitable for mass production.

It will be understood by those skilled in the art that various modifications and changes may be made to the present invention without departure from the scope thereof, which is defined by the appended claims.

What is claimed is:

1. A method for fabricating a structured high resolution scintillating device based on light guiding of secondary produced scintillating photons for use in an X-ray pixel detector device with an image detector chip (1), characterized by the steps of fabrication of a silicon pore matrix (8) presenting a pore spacing (10) corresponding to the image detector pixel size (2), by utilizing silicon etching techniques such as deep reactive ion etching, electrochemical techniques or other techniques providing high-aspect ratios such that thin pore walls of thickness reaching down to a few micrometers will be maintained for an active detection area optimization;

using the silicon pore matrix (8) as a mold when melting a scintillator material into the pores to form in each pore a single scintillating block in order to eliminate grain-boundary scattering of scintillating photons.

2. The method according to claim 1, characterized by the further step of, after etching but before molding, depositing a metallic reflective layer in the pores.

3. A method of fabricating a high resolution scintillating device for an X-ray pixel detector, comprising the steps of:

fabricating a silicon pore matrix having plural pores corresponding to locations of pixels in the X-ray pixel detector, the plural pores being formed by etching a silicon substrate;

melting a scintillating material into the plural pores of the silicon pore matrix to form in each of the plural pores a single scintillating block; and providing, after the fabricating step but before the melting step, a reflection layer for light guiding by oxidation of the silicon pore matrix or by deposition of any layer having a resulting refractive index being lower than that of the scintillating material.

4. A scintillating device for simultaneously maintaining resolution and increased sensitivity for X-ray radiation in an imaging arrangement, characterized by utilization of a fabrication method producing a silicon pore matrix (8) presenting a pore spacing (10) corresponding to an image detector pixel size (2), the pore matrix having deep pores (10) presenting thin walls of a thickness reaching down to a few micrometers to create a pore spacing corresponding to the pixel size (2) of an image detector chip (1), the pore matrix (8) further containing scintillating material which is melted into the pores (10) to form in each pore a single scintillating block in order to eliminate grain-boundary scattering of scintillating photons.

5. The device according to claim 4, characterized by a reflective layer (12) onto the thin walls of the matrix to increase light guiding down to the image detector chip (1).

6. The device according to claim 4, further comprising a reflection layer on walls of the pores, the reflection layer being one of an oxidation of the silicon pore matrix and a layer having a refractive index lower than a refractive index of the scintillating material.

7. A method of fabricating a high resolution scintillating device for an X-ray pixel detector, comprising the steps of:

forming plural pores in a silicon substrate to form a silicon pore matrix; and melting a scintillating material into the plural pores of the silicon pore matrix to form a scintillating block in each of the plural pores.

8. The method of claim 7, further comprising the step of providing a reflection layer on walls of the pores by oxidizing the silicon pore matrix in the pores.

9. The method of claim 7, further comprising the step of providing a reflection layer on walls of the pores, the reflection layer having a refractive index lower than that of the scintillating material.

10. The method of claim 7, wherein the plural pores correspond to locations of pixels in the X-ray pixel detector.

11. The method of claim 7, wherein the plural pores are spaced more closely than pixels in the X-ray pixel detector.

* * * * *